No. 762,948. PATENTED JUNE 21, 1904.
F. SCHAEFER.
APPARATUS FOR RECORDING AND REPRODUCING SOUNDS AND OPTICAL IMPRESSIONS.
APPLICATION FILED MAR. 2, 1903.
NO MODEL. 2 SHEETS—SHEET 1.

WITNESSES:
J. W. Th. Olan
J. A. McConnel

INVENTOR
Fred Schaefer
BY
Pierre Barnes.
ATTORNEY

No. 762,948. PATENTED JUNE 21, 1904.
F. SCHAEFER.
APPARATUS FOR RECORDING AND REPRODUCING SOUNDS AND OPTICAL IMPRESSIONS.
APPLICATION FILED MAR. 2, 1903.
NO MODEL. 2 SHEETS—SHEET 2.

WITNESSES:
INVENTOR
Fred Schaefer
BY
Pierre Barnes
ATTORNEY

No. 762,948. Patented June 21, 1904.

UNITED STATES PATENT OFFICE.

FRED SCHAEFER, OF SEATTLE, WASHINGTON.

APPARATUS FOR RECORDING AND REPRODUCING SOUNDS AND OPTICAL IMPRESSIONS.

SPECIFICATION forming part of Letters Patent No. 762,948, dated June 21, 1904.

Application filed March 2, 1903. Serial No. 145,779. (No model.)

*To all whom it may concern:*

Be it known that I, FRED SCHAEFER, a citizen of the United States, residing at Seattle, in the county of King and State of Washington, have invented certain new and useful Improvements in Apparatus for Recording and Reproducing Sounds and Optical Impressions, of which the following is a specification, reference being had therein to the accompanying drawings.

This invention relates to apparatus adapted to receive and reproduce actions and sounds.

In cameras heretofore in use for taking photographs upon a continuous film no provision has been made for recording the sounds accompanying the action of the scene being taken, nor have reproducing apparatus been put into practice that will transpose or reproduce the sounds and scenes as they occur.

The object of my invention is to provide an apparatus which will accomplish this object and which will produce interesting and lifelike results.

The invention consists in the novel arrangement and combination of parts hereinafter described, and illustrated in the accompanying drawings, in which—

Figure 1:
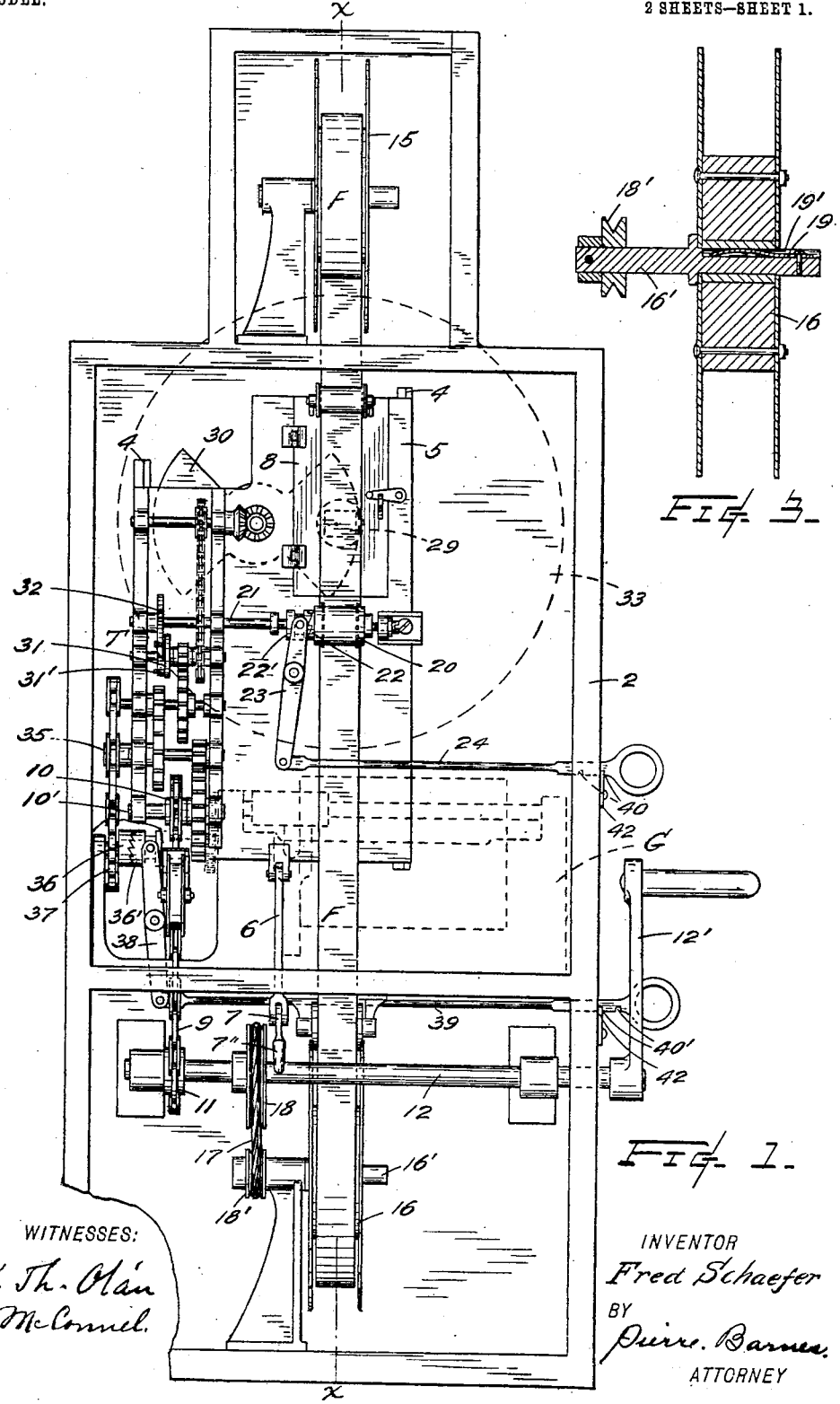
Figure 2:
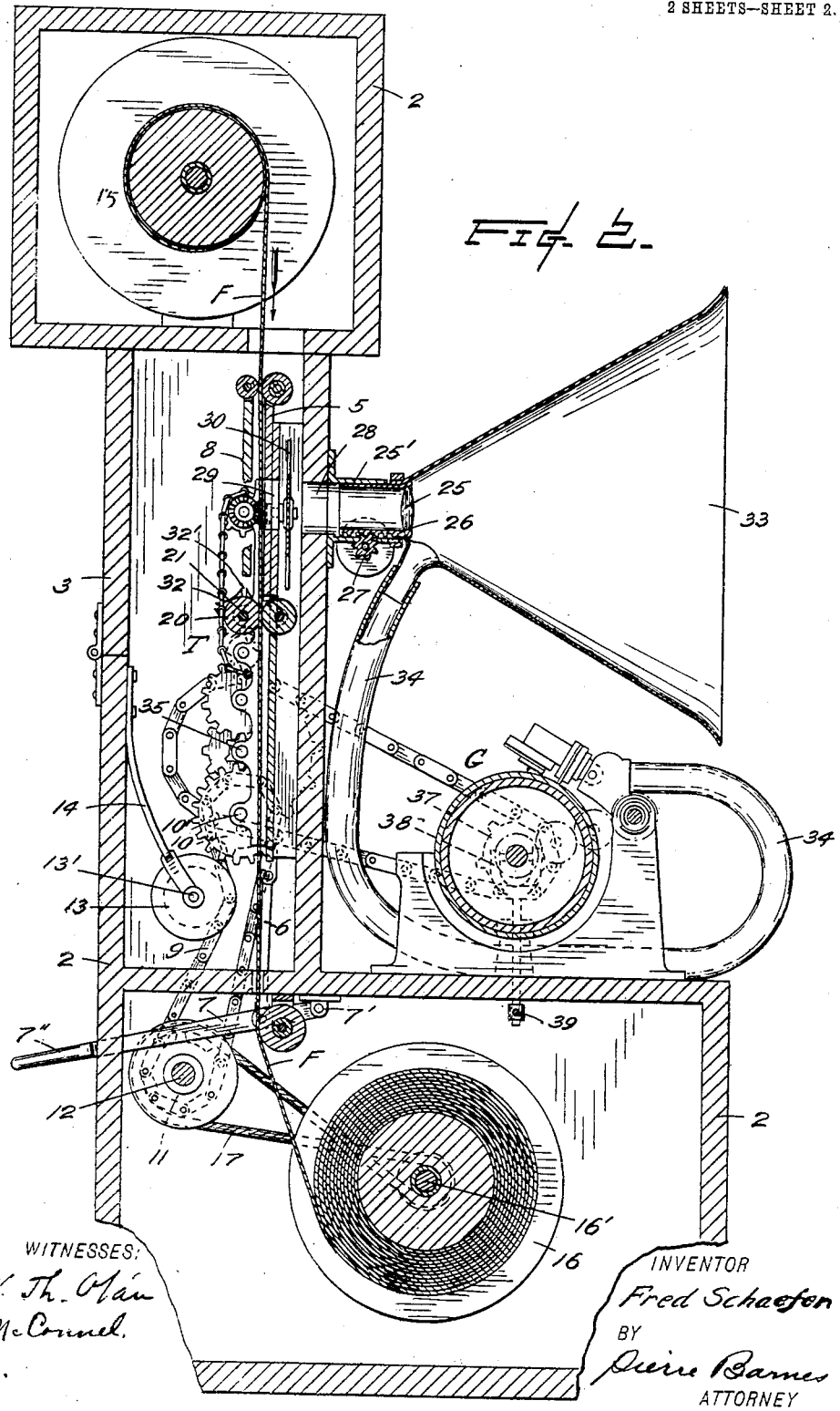

Figure 1 is a rear elevation of an apparatus embodying my invention with the back of the containing-case removed. Fig. 2 is a longitudinal section taken on line $x\,x$ of Fig. 1. Fig. 3 is an enlarged sectional detail view of a detail of the invention.

In the said drawings the reference-numeral 2 indicates the containing-case of the apparatus, which may be of any suitable construction and is provided at its rear end with a door 3, whereby access is to be had to the interior and also for the admission of a strong light at the rear of the film F for reproducing the pictures upon a screen. Slidable upon guideways 4, secured to the said case, is a frame 5, which is adjustable as to height by means of a link 6, connecting one end of a lever 7, fulcrumed at 7' and having a handle 7" projecting exteriorly of the case. The said frame is provided with a door 8 for the purpose of removing or inserting the picture-film. The frame carries the journal-bearings for the various arbors of the train T of gear and sprocket wheels, and this train of wheels is driven by sprocket-chain 9, passing around the wheel 10 upon one of the said arbors 10' from the wheel 11, mounted upon the driving-spindle 12. The driving-spindle extends outside of the case and may be rotated by any suitable motor, but preferably by a hand-actuated crank 12'. A tension-pulley 13, having its axle 13' mounted in bearings upon the extremity of a resilient arm 14, secured to the case, provides tightening means for chain 9 to compensate for changes in the position of the said driven wheel due to the moving of the frame. The film F, which would be a chemically-sensitized strip or a negative, according to whether the apparatus was being used as a camera or a reproducer, is wound from a loosely-mounted reel 15 by means of a sprocket-drum 20 engaging with perforations provided in the film, and simultaneously the slack of the same is wound upon a reel 16, frictionally engaged to its spindle 16', which is rotated from the driving-spindle 12 by belt 17, passing around pulleys 18 and 18', respectively, of spindles 12 and 16'.

An advantageous construction of the means to frictionally hold the reel 16 to its spindle, as aforementioned, is shown in Fig. 3 and comprises a leaf-spring 19, inserted in a slot 19' of the spindle 16' and which is adjusted so as to yieldingly press against the reel-bushing sufficiently to closely wind up the slack of the film and yet permit the reel to slip when the tension upon the film approaches the point of breakage. The said sprocket-drum 20 is mounted loosely upon its arbor 21, but capable of being positively engaged thereto by means of clutch-coupling comprised of a serrated disk 22, integral with the drum, which is engaged with registering serrations of a sleeve 22', splined to arbor 21 and which is controlled by a forked shifting-lever 23, connected by reach-rod 24, Fig. 1, projecting outside of the case.

Suitable lens or lenses, such as 25, are set in a telescopic tube 25', which is extensible horizontally for focusing by any suitable means, as the rack 26 and pinion 27. (Shown in Fig. 2.) In the rear of the lens-tube are apertures 28 and 29 in the case and frame, respectively, the latter being adjustable vertically, so as to take or transmit pictures out of a horizontal plane passed through the axis of the lens. Interposed between the said apertures is a shutter 30, preferably provided with two diametrically oppositely disposed wings, which as they revolve alternately mask or close the said apertures. The film-drum, and consequently the film, operates in unison with the movement of said shutter and is rotated or advanced forward only when the said apertures are closed by the shutter and is quiescent when the apertures are open, which is accomplished by means of any suitable intermittent gear of proper adjustment—as, for instance, a disk 31, mounted upon one of the said train-arbors, being provided with lateral projecting studs or pins 31', engaging radially-disposed slots 32' of wheel 32, fixedly mounted upon the drum-arbor 21.

33 is a conical horn rigidly connected to the movable member of the lens-tube and which adjacent to its apex is communicatively connected by a flexible tube or sound-conveyer 34 with the vibrating diaphragm of a graphophone G, whereby sounds may be received or delivered in line with the lens-axis.

The graphophone is operated either directly from the driving-spindle 12 or from one of the arbors, as 35, driven thereby and in unison with the film-driving mechanism; but while so connected it is arranged to be cut out or uncoupled for the purpose hereinafter described. Any suitable clutch-coupling may be utilized for this purpose, such as serrated disk member 36, integral with the normally loose driven wheel 37, being engaged by corresponding serrations of a slidable member 36', splined to its spindle and which is shifted into or out of operative engagement with its couple by a forked lever 38 and a reach-rod 39, having an end projecting outside of the case. Notches 40 and 40' are provided in the reach-rods of the film-drum and graphophone-clutching devices, respectively, to hook upon latch-strips 42 for locking the several said parts in either coupled or uncoupled positions.

The operation of the invention as a combined camera and sound-recording apparatus will first be described, it being supposed that the focus of the lens is properly adjusted and the sensitized film and record-blank are in place. The machine is started by rotating the driving-spindle 12, and within a short space of time thereafter a sharp sound, as would be caused by striking a gong or bell, and a conspicuous visible sign, as an object moved in front of the lens, are made simultaneously and are impressed, respectively, upon the record-drum and the photographic film. The apparatus continues to wind off the film and rotate the record-blank until both are "charged," so to speak. To operate the invention as a reproducer, a negative-film and corresponding record are inserted in the apparatus and the door in the rear of the case opened for the passage of light through the lens and negative to cast the images portrayed on the latter upon a screen. The driving-spindle 12 is now rotated to actuate both the kinetoscope and graphophone portions of the device until the index symbol or sound is displayed or given out from one or the other of said portions, the first of which portions to make or omit its index-sign is uncoupled and remains dormant until the other is given out, when it is immediately recoupled and both portions operate in unison or harmony one with the other and exactly the same or practically the same in which they occurred and taken by the apparatus.

The novel arrangement and combination of the parts of the apparatus are such that the sounds are projected by the horn against the screen on which the action is reproduced, thereby making a startling illusion unattainable by any other devices which have come to my notice wherein only pantomimic exhibitions or inanimate sounds are given out.

What I claim, and desire to secure by Letters Patent, is—

1. An apparatus of the class described, comprising in combination, a kinetoscope or kinetograph, a graphophone, means for operating said parts simultaneously, and means for operating them independently of each other.

2. An apparatus of the class described, comprising in combination, a main driving-spindle, a film-driving sprocket-drum loosely mounted on an arbor, clutch device for engaging said drum with the said arbor, a graphophone, operative connection between the said driving-spindle and the said arbor and also with the graphophone, the last-mentioned connection being provided with a clutch device whereby the graphophone may be disengaged or reëngaged with the said driving-spindle, substantially as described.

3. In an apparatus of the class described, the combination with a film sprocket-drum loosely mounted upon an arbor, and means to rotate said arbor, of means to engage said drum to said arbor.

4. In an apparatus of the class described, the combination of a driving-spindle, a graphophone, connection between said spindle and said graphophone whereby the latter is actuated, said connection including a clutch whereby said graphophone may be engaged or disengaged from the said driving-spindle as and for the purpose described.

5. In an apparatus of the class described, the combination with a kinetoscope provided with suitable lens, a tube-mounting for said lens, and a graphophone, of a conical-shaped horn secured to the said tube-mounting and a flexible tube connecting said horn with the diaphragm of the said graphophone.

6. In an apparatus of the class described, the combination with a containing-case provided with a vertically-movable frame, a kinetoscope, a graphophone, a train of gears mounted on arbors journaled in bearings upon said frame, a main driving-spindle, a sprocket-chain connection between said spindle and the said train of gears, of a tension-pulley connected to the case by a resilient arm, and the said arm, substantially as and for the purpose described.

In testimony whereof I affix my signature in presence of two witnesses.

FRED SCHAEFER.

Witnesses:
 PIERRE BARNES,
 P. C. DORMITZER.